United States Patent [19]
Robinson et al.

[11] 3,952,187
[45] Apr. 20, 1976

[54] CIRCUIT FOR TRANSFORMING RECTANGULAR COORDINATES TO POLAR COORDINATES

[75] Inventors: John L. Robinson, Wenonah, N.J.; Anthony Mattei, Philadelphia, Pa.

[73] Assignee: Ford Motor Company, Dearborn, Mich.

[22] Filed: June 27, 1975

[21] Appl. No.: 591,224

[52] U.S. Cl. ............................. 235/186; 235/156; 235/189
[51] Int. Cl.² ..................... G06F 7/38; G06G 7/22
[58] Field of Search .......... 235/186, 189, 156, 152; 340/347 SY, 347 DD

[56] References Cited
UNITED STATES PATENTS

| | | | |
|---|---|---|---|
| 3,631,233 | 12/1971 | McKenna | 235/189 X |
| 3,746,849 | 7/1973 | Bailey | 235/156 |
| 3,868,680 | 2/1975 | Rhodes | 235/186 X |
| 3,898,446 | 8/1975 | Vatz | 235/186 X |

Primary Examiner—Joseph F. Ruggiero
Attorney, Agent, or Firm—Robert W. Brown; Keith L. Zerschling

[57] ABSTRACT

A circuit for transforming to polar coordinate form first and second binary number electrical signals representative of rectangular coordinates or quadrature components for a vector or phasor. The circuit utilizes a programmable memory in which values corresponding to the sine and cosine functions are stored. In the preferred form, the circuit utilizes binary number electrical signals of 10 bits. The most significant bit of the polar coordinate angle is found directly from the binary number representing one of the quadrature components, whereas the next two most significant bits of the angle are found using logic circuitry in association with the binary number signals representing the quadrature components. The remaining bits of the angle are found by use of a successive approximation technique in conjunction with the values stored in the memory. Once the angle is determined, the amplitude of the vector or phasor is determined by the use of the function $P = Im(\sin\theta) + Re(\cos\theta)$ where $Im$ and $Re$ are the quadrature components. The coordinate transforming circuit is particularly useful in digital transmission and receiving systems in connection with modulation of transmitted signals and demodulation of received signals.

10 Claims, 5 Drawing Figures

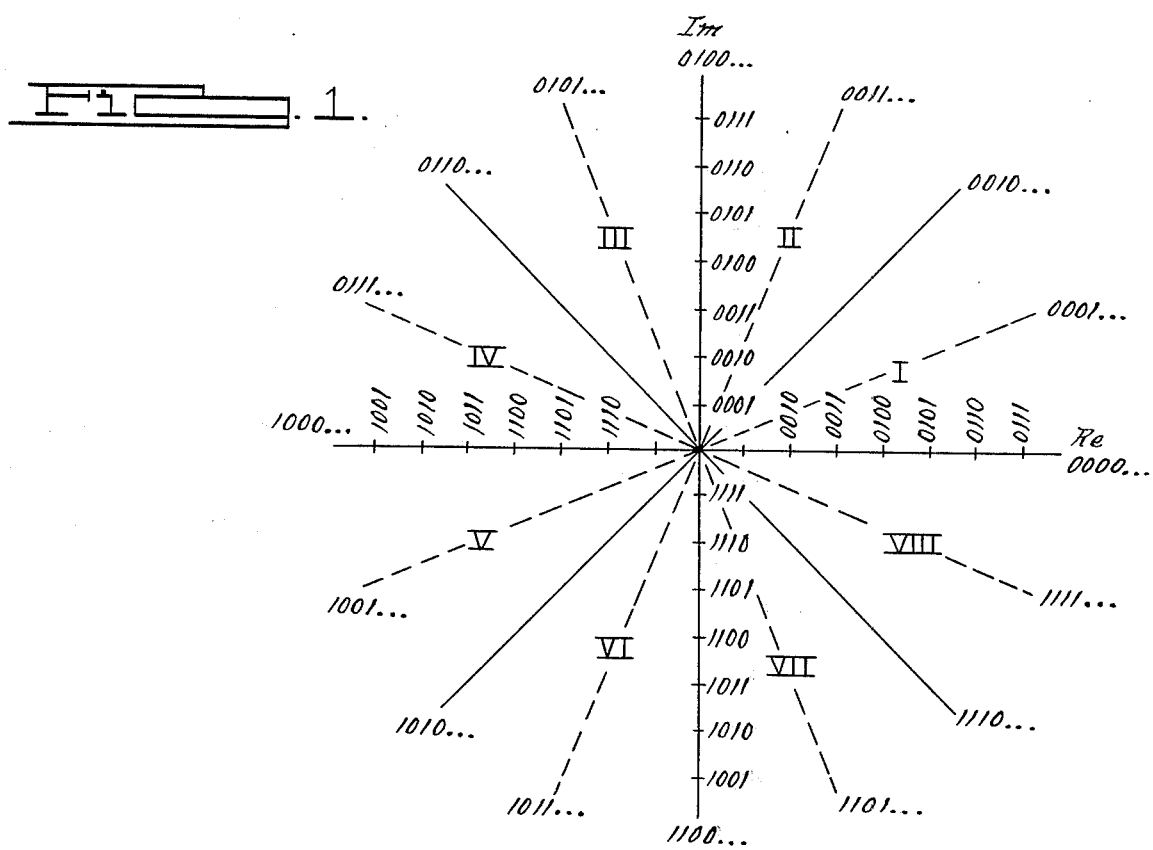
Fig. 1.
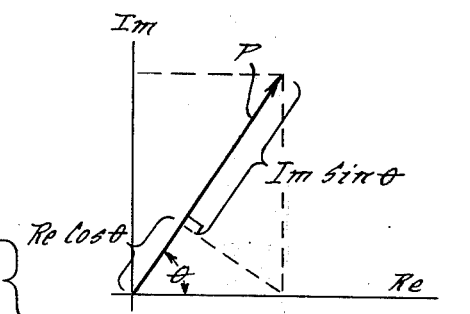
In All Octants;
$P = Im(\sin\theta) + Re(\cos\theta)$
Fig. 2.
Fig. 3.
| Octant | Re (MSB) | Im (MSB) | Sign Of Re ± Im | Three MSB's Of θ |
|---|---|---|---|---|
| I | 0 | 0 | 0 | 000... |
| II | 0 | 0 | 1 | 001... |
| III | 1 | 0 | 0 | 010... |
| IV | 1 | 0 | 1 | 011... |
| V | 1 | 1 | 1 | 100... |
| VI | 1 | 1 | 0 | 101... |
| VII | 0 | 1 | 1 | 110... |
| VIII | 0 | 1 | 0 | 111... |
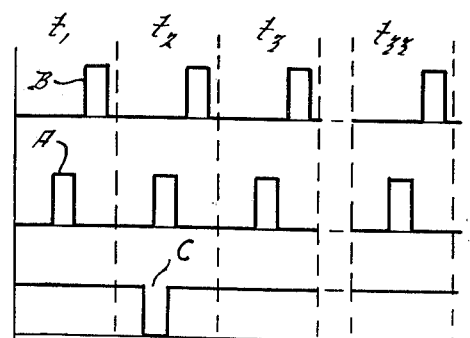
Fig. 4.

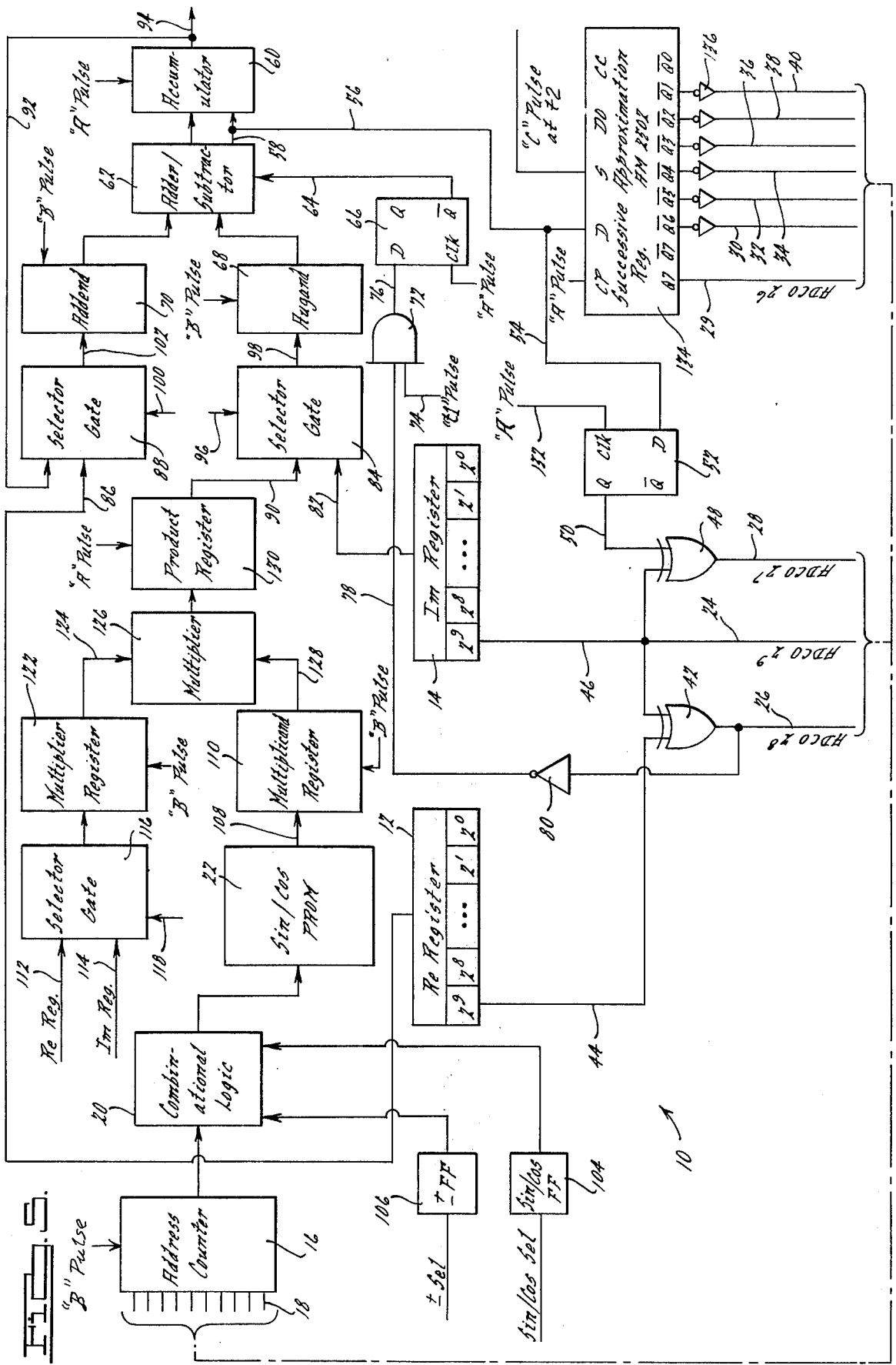

CIRCUIT FOR TRANSFORMING RECTANGULAR COORDINATES TO POLAR COORDINATES

BACKGROUND

The invention herein described was made in the course of or under a contract or subcontract thereunder, (or grant) with the Department of the Air Force. The invention relates to a circuit for transforming to polar coordinate form first and second binary number electrical signals representative of rectangular coordinates (quadrature components) for a vector or phasor. The first binary number electrical signal is representative of a coordinate dimension parallel to one axis of a two-dimensional rectangular coordinate system and the second binary number electrical signal is representative of a coordinate dimension parallel to the other axis of the two-dimensional rectangular coordinate system. The coordinate transforming circuit generates a third binary number electrical signal representative of the polar coordinate angle, measured relative to the one axis and determined by the magnitudes of the first and second binary number electrical signals. Once the third binary number electrical signal representative of the polar coordinate angle is generated, then the amplitude of the corresponding vector or phasor may be determined where required in the application of the coordinate transformation circuit.

In digital transmission and receiving systems, a transmitted carrier wave may be amplitude modulated, frequency modulated, phase modulated or, in the case of digital data transmission, frequency-shift keying or phase-shift keying may be utilized. The digital receiver of the modulated carrier wave must demodulate the wave to reconstruct the transmitted information. This may be accomplished by obtaining amplitude samples of the received waveform at a sampling rate of, for example, 230.4 kHz. The amplitude of the samples may be in the form of binary number electrical signals that can be multiplied by cosine and sine functions to produce binary number electrical signals representing the real (Re) and imaginary (Im) components of a phasor. If desired, the real and imaginary components may be filtered, translated in frequency or otherwise modified. The result is two streams of binary number samples, one stream representing the real components and the other the imaginary components of samples obtained from the received signal. The stream of real and imaginary components is demodulated to reconstruct the transmitted information. The circuit for transforming rectangular coordinate binary number electrical signals to polar coordinate binary number electrical signals is particularly suitable for use in the demodulation of the real and imaginary sample components derived from a received waveform, but the circuit and the principles embodied therein may be utilized in other applications as well.

With respect to the prior art, U.S. Pat. No. 3,648,041 to Beatrice describes an electronic angle generator in the form of an analogue circuit that transforms two voltages representative of two orthogonal components to a voltage having a magnitude proportional to the arctangent or the ratio of the two voltages Digital demodulation systems are described in U.S. Pat. Nos. 3,501,701 to Reid, 3,548,328 to Breikss, 3,600,680 to Maniere et al., 3,609,555 to VanBlerkom et al., 3,624,528 to Adkhock et al., 3,628,165 to Swan, Jr., and 3,670,250 to Fritkin. Of these patents, the Beatrice patent appears to be the most pertinent to the present invention.

SUMMARY OF THE INVENTION

In accordance with the invention, a circuit for transforming to polar coordinate form first and second binary number electrical signals representative of the rectangular coordinates of a vector or the real and imaginary components of a phasor includes a memory circuit programmed with sine and cosine values for a range of angles. Through the use of this memory and associated circuitry, the first and second binary number electrical signals are transformed to a third binary number electrical signal representative of the polar coordinate angle determined by the magnitudes and signs of the first and second binary number electrical signals. The magnitude of the vector or phasor represented by the binary number quadrature components, if required, is determined after the polar coordinate angle has been found.

In the preferred form of the invention, the rectangular or quadrature components of the vector or phasor and the polar coordinate angle are expressed as binary number electrical signals having 10 bits. The rectangular coordinate binary number signals are in two's complement binary form and the polar coordinate angle and vector or phasor amplitude are in pure binary form. The three most significant bits of the polar coordinate angle are determined either directly from the rectangular coordinate signals or are obtained by logic circuits responsive to this coordinate information. The two most significant bits of the polar coordinate angle define the quadrant in which the angle is located and the third most significant bit determines the octant in which the angle is located. The remaining and lesser significant bits of the polar coordinate angle are determined by an iterative process in which the sine and cosine functions of the memory are utilized in conjunction with a successive approximation circuit to establish, in the order of their decreasing significance and by utilization of a technique involving setting a given bit to a predetermined logic state as a test condition, the correct binary state for each of the remaining bits of the polar coordinate angle.

In a coordinate system having a horizontal axis and coordinate Re, a vertical axis or coordinate Im, a vector or phasor P and an angle $\theta$ measured from the positive axis Re to the vector or phasor P, the real and imaginary components Re and Im are given by the equations:

$$Re = P \cos \theta \tag{1}$$

$$Im = P \sin \theta \tag{2}$$

Also, a well-known trigonometric identity is as follows:

$$\sin(\theta - \theta_t) = \sin\theta \cos\theta_t - \cos\theta \sin\theta_t \tag{3}$$

When equation (3) above is multiplied by $P$ and $Re$ and $Im$ are substituted for $P \cos \theta$ and $P \sin \theta$, respectively, the following equation results:

$$P \sin(\theta - \theta_t) = Im \cos\theta_t - Re \sin\theta_t \tag{4}$$

In the above equation, $\theta_t$ is a test angle for the polar coordinate angle. The first two most significant bits of the actual polar coordinate angle are determined in the manner described above and are definitive of the quadrant in which the angle is located. The third most significant bit may be determined by logic circuitry as described above and defines the octant in which an angle is located. The fourth most significant bit may be set to a bits logic state, for example, a logic one, and the bit of lesser significance are maintained at a logic zero state so that the test angle is thus established. The test angle is used to calculate $P \sin(\theta - \theta_t)$ utilizing the right-hand side of equation (4). If this result is zero, then either the test angle $\theta_t$ is the actual polar coordinate angle $\theta$, or $P$ is equal to zero. On the other hand, if the result of the calculation is greater than zero, then $\theta$ must be greater than $\theta_t$ and the fourth most significant bit is left in the predetermined state to which it had been set, a logic one. If the result of the calculation is negative, then $\theta_t$ is greater than $\theta$, and the fourth most significant bit is changed from a logic one state to a logic zero state. In either case, the fifth most significant bit then is set to a predetermined logic one state and the calculation of equation (4) is repeated using this new test angle $\theta_t$. Thus, the process continues until all 10 bits of the actual polar coordinate angle have been determined.

In summary, in the preferred form of the invention, the first three most significant bits of the polar coordinate angle binary number electrical signal are determined through logic circuitry and the remaining seven bits of lesser significance are determined through a successive approximation process utilizing equation (4) above.

After the polar coordinate angle is determined as described above, the magnitude of the vector or phasor $P$ may be generated where required. From the equation $P^2 = Re^2 + Im^2$ and from the relationships expressed in equations (1) and (2), the following expression is obtained:

$$P = Im \sin \theta + Re \cos \theta \qquad (5)$$

It was previously stated that the polar coordinate angle and the vector or phasor amplitude are in pure binary form. However, both the polar coordinate angle $\theta$ and vector or phasor $P$ may be considered as being in binary two's complement form. The vector or phasor $P$ is always positive and has a zero for its first bit (sign bit position). The polar coordinate angle $\theta$ may be considered to represent values from 0° to $$\left(180° - \frac{3600}{2n}\right),$$

where $n$ is the number of bits representing $\theta$, and from $-180°$ to $$\left(0° - \frac{3600}{2n}\right).$$

The invention may be better understood by reference to the detailed description which follows and to the drawings:

BRIEF DESCRIPTION OF THE DRAWINGS

FIG. 1 is a drawing of a combined rectangular and polar coordinate system having magnitude and angular dimensions in binary number form;

FIG. 2 is a graph illustrating the manner in which the magnitude of a phasor $P$ may be determined from real and imaginary components thereof and related mathematical expression;

FIG. 3 is a truth table illustrating for each of the octants of a coordinate system the most significant bits of the real and imaginary quadrature components, the sign of the real component plus or minus the imaginary component and the three most significant bits of the polar coordinate angle $\theta$;

FIG. 4 consists of two electrical waveforms illustrating timing pulses that may be used in the coordinate transforming circuit; and FIG. 5 is a schematic electrical diagram of a preferred embodiment of the coordinate transforming circuit of the invention.

DETAILED DESCRIPTION

With reference now to the drawings, wherein like numerals or designations refer to like items in the several views, there is shown in FIG. 1 a combination complex number or rectangular coordinate s system and polar coordinate system. The real number axis Re is horizontal and the imaginary axis Im is vertical. In this two-dimensional coordinate system, distances along the Re axis are measured parallel thereto and distances along the Im axis are measured parallel to it. The divisions along the Re and Im axes are written in binary two's-complement form with four bits designating each division. In two's-complement form, the first bit of the binary number indicates the sign of the number. Thus, a most significant bit of zero indicates a positive number and a one at this location indicates a negative number. From this, it is apparent that numbers on the Re axis to the right of the origin are positive numbers, those to the left are negative numbers, those on the Im axis above the origin are positive numbers and those on this axis below the origin are negative numbers.

In the coordinate system illustrated in FIG. 1, angles are measured from the positive Re axis in a counterclockwise direction to the vector or phasor extending from the origin to some point in the coordinate system, as is conventional. The total 360° of the coordinate system is divided by the solid lines in FIG. 1 into eight octants I through VIII. Octants I and II comprise the first quadrant, octants III and IV the second quadrant, etc. The broken lines in FIG. 1 bisect the octants so that the full 360° is divided into 16 parts for purposes of illustration only. Each of the angles represented by both the broken and solid lines and the real and imaginary axes are given an angle designation consisting of four binary number bits followed by an unspecified number of other bits, indicated by dots, which are zeros. These angle designations may be regarded as being in pure binary form or in two's-complement form. In the preferred form of the electrical circuit hereinafter described, the angular positions are defined to an accuracy of ten bits, which therefore divides the 360° of the coordinate system into 1,024 parts so that a change of one unit in the least significant bit of the 10 bits represents a change of 360°/1,024, or 0.352°. Of course, additional bits may be utilized to provide greater accuracy. Similarly, the rectangular coordinates, the Re and Im components of a vector or phasor in the preferred electrical circuit, are designated by 10 bits in two's-complement form. Only four bits for the Re and Im components are illustrated in FIG. 1 for simplicity.

With particular reference now to FIG. 2, there is shown a graph of a phasor P located in the first quadrant. The angle $\theta$ is measured from the positive Re axis to the phasor P and the magnitude of the phasor P is determined by the function $P = Re \cos \theta + Im \sin \theta$. To the left of the graph, there is given an equation illustrating the magnitude determination for $P$ in all of the octants.

In FIG. 3, the most significant bits for the real and imaginary components in each of the eight octants are illustrated. Also, the mathematical sign of the real plus or minus the imaginary component is given for each octant as produced by the addition or subtraction of these components in two's-complement form so that the most significant bit of the result is the sign, a zero indicating a positive number and a one a negative number. Further, the three most significant bits of an angle $\theta$ in each of the eight quadrants is given. Regardless of the number of bits used in the binary form designation of the angle, the first three bits are as indicated in FIG. 3 for angles in each of the respective octants.

From FIG. 3, it may be seen that in octants I through IV, the most significant bit (MSB) of an angle $\theta$ is always a zero and that the most significant bit of the imaginary component in these octants also is zero. In octants V through VIII, the most significant bit of a polar coordinate angle always is a one and is identical to the most significant bit of the imaginary component. Thus, the most significant bit of any polar coordinate angle is the most significant bit of the imaginary component and may be obtained directly therefrom.

With respect to the second most significant bit of an angle $\theta$ in the various octants, it may be seen that whenever the most significant bits of the real and imaginary components are the same, then the second most significant bit of the polar coordinate angle is a zero, and when the most significant bits of the real and imaginary components are different, then the second most significant bit of the angle $\theta$ is a one. Thus, the second most significant bit of any polar coordinate angle may be obtained by the use of an exclusive OR gate having two inputs, one connected to the most significant bit of the Re component and the other connected to the most significant bit of the Im component. The output of the exclusive OR gate then will be a one whenever the most significant bits of these components are different, a zero whenever they are the same, and therefore provides a direct indication of the second most significant bit of the polar coordinate angle represented by these rectangular coordinates.

In a somewhat similar manner, the third most significant bit of a polar coordinate angle $\theta$ may be obtained from the rectangular coordinates corresponding to this angle. The first two most significant bits of the polar coordinate angle determine the quadrant in which the angle is located. For example, in the first quadrant (octants I and II), the two most significant bits of $\theta$ are zero and zero; in the second quadrant, they are zero and one; in the third quadrant, they are one and zero; and in the fourth quadrant they are one and one. With this knowledge of the quadrant in which the polar coordinate angle corresponding to given Re and Im components is located, the Re and Im components may be added or subtracted to produce a result having the sign illustrated in the fourth column in FIG. 3 for each of the eight octants. Then, if an exclusive OR function is performed with the most significant bit of the Im component and the sign of Re plus or minus Im as the other input to the exclusive OR, the output will be the third most significant bit of the polar coordinate angle corresponding to the Re and Im components.

In the preferred form of the invention, the third most significant bit of $\theta$ is found in the manner described above. However, the fourth through tenth bits are found by a successive approximation technique hereinafter described and the third most significant bit also could be found by this technique. Of course, other logic functions may be implemented for determining the second and third most significant bits of the polar coordinate angle $\theta$.

In FIG. 4, there are shown three electrical pulse waveforms that are utilized in conjunction with the circuit illustrated in FIG. 5. The waveforms have the phase relationships illustrated and are divided into time slots t1 through t33. In each of the time slots, a pulse A in the second waveform occurs shortly before a pulse B in the first waveform. These pulses A and B in the various time slots may be provided in any suitable manner, and are utilized to control the functions performed by the circuit elements in the circuit of FIG. 5. Pulse C in the third waveform also is utilized in the circuit of FIG. 5.

With reference now to FIG. 5, there is shown a schematic electrical diagram of a circuit in accordance with the invention. The circuit, generally designated by the numeral 10, includes an Re register 12 capable of storing 10 bits of binary data. The most significant bit is designated $2^9$ and the least significant bit is $2^0$. Similarly, an Im register 14 is provided with capability of storing 10 bits of binary data. Binary number electrical signals for the Re and Im components of a phasor are supplied, respectively, by circuit means not shown, to the registers 12 and 14. In addition to the binary number electrical signals in registers 12 and 14, an address counter 16 includes register means for storing a third binary number electrical signal, the polar coordinate angle $\theta$, determined bit by bit by the circuit 10 utilizing the binary number electrical signals in the registers 12 and 14.

The address counter 16 has 10 input leads 18, each of which corresponds to one bit of the polar coordinate angle $\theta$. Each combination of bits in the input register of the address counter 16 is utilized to provide an address that is supplied via a combinational logic circuit 20 to a programmable-read-only memory (PROM) 22 which contains a table of sine/cosine values for angles from $-90°$ to $+90°$ in increments of $0.352°$, corresponding to a change of one unit in the least significant bit of a polar coordinate angle. Each one of the 10 input leads 18 is connected to one of the 10 leads 24, 26, 28, 29, 30, 32, 34, 36, 38 and 40.

Lead 24 is connected to the most significant bit position in the Im register and transfers this bit directly to the storage register in the address counter 16 as the most significant bit of the polar coordinate angle $\theta$. The lead 26 is connected to the second most significant bit position in the storage register of address counter 16 and is the output of an exclusive OR gate 42 having one input 44 connected to the most significant bit position in the Re register 12 and having its other input 46 connected to the most significant bit position in the Im register 14. The lead 28 is connected to the third most significant bit position in the register of address counter 16 and is the output of an exclusive OR gate 48. One input to the exclusive OR gate 48 is the most significant bit from the Im register 14 and the other input 50 is connected to the Q-output of a type-D flip-flop 52.

The D-input to the flip-flop 52 is connected by leads 54 and 56 to the sign-bit input terminal 58 of an accumulator 60. The input to the accumulator 60 is a binary number electrical signal from an adder/subtractor 62. Terminal 58 is the sign-bit output of the adder/subtractor.

A control line 64 to the adder/subtractor is connected to the $\overline{Q}$-output of a type-D flip-flop 66 and the signal thereon controls whether a binary number electrical signal in an augand register 68 is added to or subtracted from a binary number electrical signal in an addend register 70. If the electrical signal on lead 64 is a logic one, the addend and augand are added, and if it is a logic zero, they are subtracted. The D-input to the flip-flop 66 is obtained from the output of an AND gate 72. In the absence of a positive "t1" pulse on input lead 74 to this AND gate, this input is at a logic zero level and the AND gate output on lead 76 is maintained at a logic zero level causing the signal on lead 64 to be maintained at a logic one level indicating that the adder/subtractor is to perform addition.

The second input lead 78 to the AND gate 72 is obtained from the output of an inverter 80 which has its input connected to the lead 26 from the exclusive OR gate 42. As was previously stated, this lead 26 has a logic zero level on it when the signs of the Re and Im binary number electrical signals are the same and a logic one when they are different. The logic zero thereon indicates that subtraction is to be performed and a logic one indicates that an addition is to be performed. The output from the inverter 80 on lead 78 is a logic one when subtraction is required and the coincidence of this logic one with a t1 pulse on lead 74 of AND gate 72 produces a logic one level at its output 76, which then produces a logic zero on lead 64 controlling the adder/subtractor 62. An opposite result occurs when a "t1" pulse appears on lead 74 and a logic zero is on input lead 78, resulting in addition by the adder/subtractor 62.

The Im binary number electrical signal is supplied as one input 82 to a selector gate 84. Similarly, the Re binary number electrical signal is supplied as one input 86 to a selector gate 88. The selector gate 84 has a second input 90, and the selector gate 88 has a second input 92, which is connected to the binary number sum appearing at the output lead 94 of the accumulator 60. A control line 96 determines which of the inputs 82 or 90 is transferred to the output 98 of the selec or gate 84, and a control line 100 determines which of the inputs 86 or 92 is transferred to the output 102 of the selector gate 88. The gate outputs 98 and 102 from the inputs to the augand and addend registers 68 and 70, respectively.

The sine/cosine memory 22 preferably is utilized so that only one set of angle values are located in memory. Since the sine of an angle is equal to the cosine of its complement, this may be readily achieved by suitable logic circuitry 20. A sine/cosine flip-flop 104 forms an input to the combinational logic circuitry 20 to indicate to this logic circuitry and the memory 22 whether or not the sine or cosine of the angle appearing at the output of the address counter 16 it to be selected. A flip-flop 106 is utilized to indicate to the logic circuit 20 and memory 22 whether the plus or minus sine $\theta$ or plus or minus cosine $\theta$. Of course, the combinational logic circuit 20 and flip-flops 104 and 106 could be deleted if the memory 22 were considerably enlarged so that a full set of sine and cosine values were available for each angle appearing at the output of the address counter 16.

The sine or cosine value from the memory 22, determined by the angle stored in the address counter 16, is supplied as the input 108 to a multiplicand register 110. The Re and Im binary number electrical signals are supplied as inputs 112 and 114, respectively, to a selector gate 116. Which of the components Re or Im is selected by the gate 116 is determined by the input on lead 118.

The contents of the multiplier register 122 forms an input 124 to a multiplier 126 and the contents of the multiplicand register 110 forms the other input 128 to the multiplier 126. The resulting product is transferred from the multiplier to a product register 130, the output of which is the input 90 to selector gate 84.

In the operation of the circuit 10, when the Re and Im binary number electrical signals are supplied to the registers 12, and 14, the first three most significant bits are found immediately. The first two most significant bits appear on leads 24 and 26, respectively, and are supplied to the address counter 16, and the third bit is found immediately by the supply of a "t1" pulse on lead 74 of AND gate 72 and an "A" pulse on the clock input of flip-flop 66. At the same time, pulses applied to the control leads 96 and 100 of the selector gates 84 and 88 causes the Im and Re components to be transferred, respectively, into the augand register 68 and addend register 70. Depending upon whether the signs of the Re and Im components are the same or different, the adder/subtractor 62 performs an addition or subtraction and, upon occurrence of a "A" pulse, the result is transferred to the accumulator 60. The sign signal on terminal 58 indicates whether the result is positive or negative and is supplied via leads 56 and 54 to the D-input of the flip-flop 52. It is transferred by the "A" pulse, applied to the clock input 132 of this flip-flop, to the Q-output lead 50. As a result, the third most significant bit appears on the output lead 28 of the exclusive OR gate 48 for reasons which were explained in connection with the truth table of FIG. 3. These events occur during time slot t1.

Following this determination of the first three most significant bits of the polar coordinate angle $\theta$, the remaining seven bits of lesser significance are determined in the order of their decreasing significance. This is accomplished by means of a successive approximation technique that utilizes a successive approximation register available commercially as a type AM 2502 from Advanced Micro Devices, Inc., Sunnyvale, California.

The successive approximation register 134 has a start input S which is supplied with the "C" pulse that occurs during time slot t2. It also has a data input D connected by lead 56 to the sign-bit input 58 to the accumulator 60. In addition, the successive approximation register 134 has a clock pulse input terminal CP which is supplied with "A" pulses that occur during the time slots t2, t6, t10, t14, t18, t22, t26 and t30. The successive approximation register 134 has outputs identified as Q7, to which lead 29 is connected, and $\overline{Q6}$ through $\overline{Q1}$. Outputs $\overline{Q6}$ through $\overline{Q1}$ are connected through inverters 136 to produce the output signals Q6 through Q1 on the leads 30, 32, 34, 36, 38 and 40, respectively. The Q7 output signal is the fourth most significant bit of the polar coordinate angle $\theta$, and the Q6 through Q1 output signals are in progressively decreasing order of significance from the fifth most significant bit to the tenth or least most significant bit of the polar coordinate angle $\theta$.

When the "C" pulse at time slot t2 appears at the S input of the successive approximation register 134, the Q7 output thereof is set at a logic one level and the remaining outputs Q6 through Q1 are set at zero logic levels. When the "B" pulse occurs during time slot t2, the polar coordinate test angle $\theta_t$, having the fourth most significant bit set to the predetermined logic one level as previously stated, is supplied to the memory 22 through the address counter 16 and combinational logic circuit 20. When the "B" pulse of time slot t3 occurs, $-\sin e\ \theta_t$ is transferred from the memory 22 to the multiplicand register 110 and the Re binary number electrical signal on input 112 is transferred to the multiplier register 122. The binary number electrical signals in the multiplier and multiplicand registers are multiplied by the multiplier 126 to produce the product $-\text{Re}\sin\theta_t$, which product is transferred to the product register 130 upon the occurrence of the "A" pulse of time slot t4.

Upon the occurrence of the "B" pulse of time slot t4, the $-\text{Re}\sin\theta_t$ product is transferred to the augand register 68. Also, the cosine of $\theta_t$ is transferred to the multiplicand register 110 from the memory 122 and the Im binary number electrical signal is transferred to the multiplier register 122. The binary number electrical signals in registers 122 and 110 then are multiplied in the multiplier 126 and, upon the occurrence of the "A" pulse of time slot t5, the product Im cos $\theta_t$ is transferred to the augand register 68. On the preceding "B" pulse, the product $-\text{Re}\sin\theta_t$ will have been transferred from the augand register 68 to the adder/subtractor 62 and into the accumulator 60. The product in the accumulator is supplied via lead 92 and selector gate 88 to the addend register 70. Upon the occurrence of the "B" pulse of time slot t5, the adder/subtractor produces the sum (Im cos $\theta_t$ – Re sin $\theta_t$), which result is transferred to the accumulator 60. The sign of the result is applied via lead 56 to the D-input of the successive approximation register 134. If the sign is a logic zero, indicating a positive result of the addition, then the actual polar coordinate angle $\theta$ is greater than or equal to $\theta_t$ and the test bit Q7 is maintained by the successive approximation register 134 at a logic one level. The data on input D is set into Q7 on an "A" pulse of t6.

Upon the occurrence of the "A" pulse at time slot t6, which is applied to the CP input of the register 134, the output Q6 is set at a logic one level and the remaining less significant bits are set at a logic zero level. The result is a new test polar coordinate angle $\theta_t$, which is processed to produce once again the sum (Im cos $\theta_t$ – Re sin $\theta_t$). This occurs during the time slots t6 through t9.

The remaining bits of the actual polar coordinate angle are approximated in this fashion until all 10 bits of the polar coordinate angle are stored in the address counter register 16. In this connection, it is preferred that circuit means be provided for detecting the condition during the course of any of the approximations wherein the sum ($Im \cos \theta_t - Re \sin \theta_t - Re \sin \theta_t = 0$). This indicates that the actual polar coordinate angle has been found. Further computations with test angles to determine polar coordinate angle bits of lesser significance then are no longer required and should be halted. Also, it is preferred that the condition $Im = 0$ and $Re = 0$ or $Re = Im = 0$ be detected to indicate $\theta = 0°/180°$ or $\theta = 90°/270°$ or an undefined condition.

During time slots t30 through t33, the magnitude of the phasor having components Re and Im is found. At the end of time slot 29, the actual polar coordinate angle is stored in the address counter 16. During time slot t31, the cosine of this angle $\theta$ is multiplied by the Re value in accordance with the equation in FIG. 2. During time slot t32, the product (Im sin $\theta$) is produced in the product register 130 and the previous product (Re cos $\theta$) will have been placed in the addend register 70. During time slot t33, the adder/subtractor 62 produces the sum (Im sin $\theta$ + Re cos $\theta$), which equals the magnitude of the phasor P corresponding to the rectangular coordinate components Re and Im.

Based upon the foregoing description of the invention, what is claimed is:

1. A circuit for transforming to polar coordinate form first and second binary number electrical signals representative of rectangular coordinates for a vector or phasor or the like, said first binary number electrical signal being representative of a coordinate dimension parallel to one axis of a rectangular coordinate system and said second binary number electrical signal being representative of a coordinate dimension parallel to another axis of said rectangular coordinate system, said circuit generating a third binary number electrical signal representative of the polar coordinate angle, measured relative to said one axis and determined by the magnitudes of said first and second binary number electrical signals, said circuit comprising:

first register means for storing said first binary number electrical signal;

second register means for storing said second binary number electrical signal;

third register means for accumulating the bits forming said third binary number electrical signal, the most significant bit of said second binary number electrical signal being coupled to the most significant bit position of said third register means;

circuit means for setting a second bit position of said third register means to a predetermined logic state;

memory circuit means programmed to provide sine and cosine values of the angle represented by the binary number contents of said third register means;

multiplier circuit means, coupled to said memory circuit means and to said first and second register means, for multiplying the contents of said second register means by said cosine value to form a first product and to multiply the contents of said first register means by said sine value to form a second product;

circuit means for determining if one of said products is greater than the other of said products; and circuit means for changing said predetermined logic state setting of said second bit position of said third register means if said one of said products is greater than said other of said products.

2. A coordinate transforming circuit according to claim 1 which includes circuit means, coupled to and utilizing said memory circuit means and said multiplier circuit means and utilizing said first, second and third binary number electrical signals stored, respectively, in said first, second and third register means, for calculating the magnitude of said vector or phasor by the summation of the products obtained by multiplication in said multiplier circuit means of one of said first or second binary number electrical signals by the value of the cosine of the angle represented by said third binary number electrical signal and by multiplication of the other of said first or second binary number electrical signals by the value of the sine of the angle represented by said third binary number electrical signal.

3. A circuit for transforming to polar coordinate form first and second binary number electrical signals representative of rectangular coordinates for a vector or phasor, said first binary number electrical signal being representative of a coordinate dimension parallel to one axis of a rectangular coordinate system and said second binary number electrical signal being representative of a coordinate dimension parallel to an other axis of said rectangular coordinate system, said circuit generating a third binary number electrical signal representative of the polar coordinate angle, measured relative to said one axis and determined by the magnitudes of said first and second binary number electrical signals, said circuit comprising:

first register means for storing said first binary number electrical signal;

second register means for storing said second binary number electrical signal;

third register means for accumulating the bits forming said third binary number electrical signal, the most significant bit of said second binary number electrical signal being coupled to the most significant bit position of said third register means;

logic circuit means, having input terminals coupled to said first and second register means and having an output terminal coupled to the second most significant bit position of said third register means, for setting the second most significant bit position of said third register means to either a state corresponding to a logic one or a logic zero depending upon whether the most significant bits of said first and second binary number electrical signals are different or the same; and circuit means for successively approximating a plurality of bits of said third binary number electrical signal, said plurality of bits being successively approximated in decreasing order of their significance.

4. A coordinate transforming circuit according to claim 3 wherein said circuit means for successively approximating said plurality of bits comprises memory circuit means programmed to provide sine and cosine values of the angle represented by the binary number contents of said third register means and multiplier circuit means, coupled to the output of said memory circuit means and to said first and second register means, for multiplying the contents of said second register means by said cosine value to form a first product and for multiplying the contents of said first register means by said sine value to form a second product, and circuit means for comparing said first and second products to determine after each successive approximation the correct setting for one of said plurality of bits.

5. A coordinate transforming circuit according to claim 3 which includes circuit means for calculating the magnitude of said vector or phasor by the summation of the products obtained by multiplication of one of said first or second binary number electrical signals by the value of the cosine of the angle represented by said third binary number electrical signal and by multiplication of the other of said first or second binary number electrical signals by the value of the sine of the angle represented by said third binary number electrical signal.

6. A coordinate transforming circuit according to claim 4 which includes circuit means, including and utilizing said memory circuit means and said multiplier circuit means and utilizing said first, second and third binary number electrical signals stored, respectively, in said first, second and third register means, for calculating the magnitude of said vector or phasor by the summation of the products obtained by multiplication in said multiplier circuit means of one of said first or second binary number electrical signals by the value of the cosine of the angle represented by said third binary number electrical signal and by multiplication of the other of said first or second binary number electrical signals by the value of the sine of the angle represented by said third binary number electrical signal.

7. A circuit for transforming to polar coordinate form first and second binary number electrical signals representative of rectangular coordinates for a vector or phasor, said first binary number electrical signal being representative of a coordinate dimension parallel to one axis of a rectangular coordinate system and said second binary number electrical signal being representative of a coordinate dimension parallel to an other axis of said two-dimensional rectangular coordinate system, said circuit generating a third binary number electrical signal representative of the polar coordinate angle, measured relative to said one axis and determined by the magnitudes of said first and second binary number electrical signals, said circuit comprising:

first register means for storing said first binary number electrical signal;

second register means for storing said second binary number electrical signal;

third register means, having at least five bit positions, for accumulating the bits forming said third binary number electrical signal, the most significant bit of said second binary number electrical signal being coupled to the most significant bit position of said third register means;

logic circuit means, having input terminals coupled to said first and second register means and having an output terminal coupled to the second most significant bit position of said third register means, for setting the second most significant bit position of said third register means to a state corresponding to a logic one or logic zero depending upon whether the most significant bits of said first and second binary number electrical signals are different or the same;

circuit means coupled to said first and second register means, for adding and subtracting said first and second binary number electrical signals, said adding and subtracting circuit means generating an output signal indicative of the sign of the result of adding or subtracting said first and second binary number electrical signals;

logic circuit means, having input terminals coupled to said second register means and supplied with said output signal indicative of sign, said logic circuit means having an output coupled to the third most significant bit position of said third register means; and successive approximation circuit means for successively approximating a plurality of bits of said third binary number electrical signal in decreasing order of their significance.

8. A coordinate transforming circuit according to claim 7 which includes circuit means for calculating the magnitude of said vector or phasor by the summation of the products obtained by multiplication of one of said first or second binary number electrical signals by the val e of the cosine of the angle represented by said third binary number electrical signals and by multiplication of the other of said first or second binary number electrical signals by the value of the sine of the angle represented by said third binary number electrical signal.

9. A circuit for transforming to polar coordinate form first and second binary number electrical signals representative of rectangular coordinates for a vector or phasor, said first binary number electrical signal being representative of a coordinate dimension parallel to one axis of a rectangular coordinate system and said second binary number electrical signal being representative of a coordinate dimension parallel to an other axis of said rectangular coordinate system, said circuit generating a third binary number electrical signal representative of the polar coordinate angle, measured relative to said one axis and determined by the magnitudes of said first and second binary number electrical signals, said circuit comprising:

first register means for storing said first binary number electrical signal;

second register means for storing said second binary number electrical signal;

third register means, having at least three bit positions, for accumulating the bits forming said third binary number electrical signal, the most significant bit of said second binary number electrical signal being coupled to the most significant bit position of said third register means;

logic circuit means, having inputs coupled to said first and second register means and having an output coupled to the second most significant bit position of said third register means, for setting the second most significant bit position of said third register means to a state corresponding to a logic one if the most significant bits of said first and second binary number electrical signals are in correspondingly different logic states and to a state corresponding to a logic zero if the most significant bits of said first and second binary number electrical signals are in correspondingly the same logic state;

circuit means for setting a third bit position of said third register means to a predetermined logic state, said third bit position being less significant then said most significant and second most significant bit positions of said third register means;

a memory circuit having an input coupled to said third register means and having an output, said memory circuit being programmed to provide at its output sine and cosine values of the angle represented by the contents of said third register means;

multiplier circuit means, coupled to said output of said memory circuit and to said first and second register means, for multiplying the contents of said second register means by the cosine value to form a first product and for multiplying the contents of said first register means by the sine value to form a second product;

circuit means, coupled to said multiplier circuit means, for calculating the difference between said first and second products and for generating a fourth electrical signal having one of two conditions depending upon whether said difference is positive or negative; and circuit means for maintaining or changing said predetermined logic state setting of said third bit position of said third register means depending upon which of said two conditions said fourth electrical signal is in.

10. A coordinate transforming circuit according to claim 9 which includes circuit means, including and utilizing said memory circuit means and said multiplier circuit means and utilizing said first, second and third binary number electrical signals stored, respectively, in said first, second and third register means, for calculating the magnitude of said vector or phasor by the summation of the products obtained by multiplying in said multiplier circuit means one of said first or second binary number electrical signals by the value of the cosine of the angle represented by said third binary number electrical signal and by the multiplication of the other of said first or second binary number electrical signals by the value of the sine of the angle represented by said third binary number electrical signal.

* * * * *

UNITED STATES PATENT OFFICE
CERTIFICATE OF CORRECTION

PATENT NO. : 3,952,187
DATED : April 20, 1976
INVENTOR(S) : John L. Robinson et al It is certified that error appears in the above-identified patent and that said Letters Patent are hereby corrected as shown below:

On the cover sheet Item [73] should read as shown.

-- Aeronutronic Ford Corporation, Blue Bell, Pa.--

Signed and Sealed this

Seventeenth Day of August 1976

[SEAL]

Attest:

RUTH C. MASON
*Attesting Officer*

C. MARSHALL DANN
*Commissioner of Patents and Trademarks*